June 16, 1925.
W. C. GRUNOW ET AL
1,542,550
VISOR COVER STRETCHING AND FRAME INSERTING MACHINE
Filed July 26, 1922  2 Sheets-Sheet 1
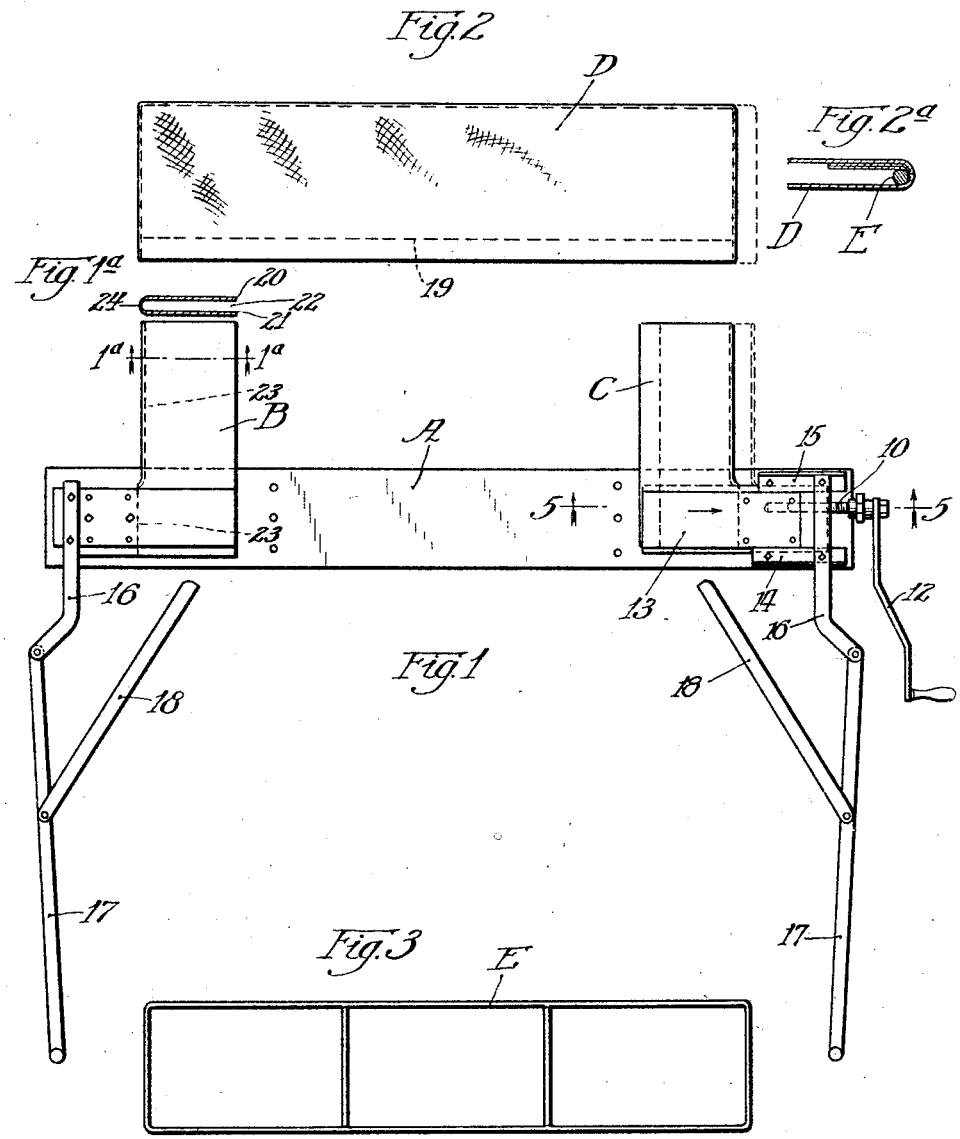
Inventors.
William C. Grunow.
Otto Johnson.
By: Gabel & Mueller Attys.

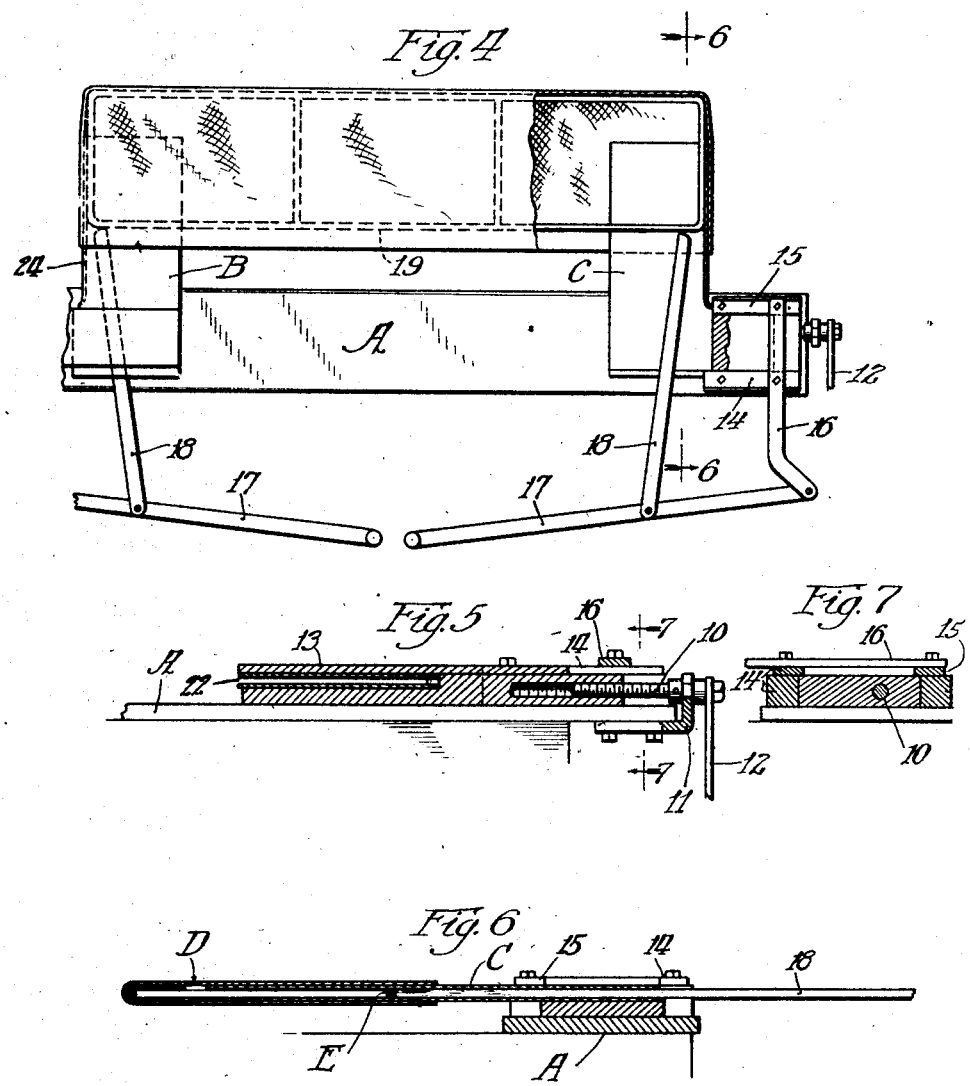

Patented June 16, 1925.

1,542,550

UNITED STATES PATENT OFFICE.

WILLIAM C. GRUNOW, OF CHICAGO, AND OTTO JOHNSON, OF BROOKFIELD, ILLINOIS, ASSIGNORS TO GRIGSBY-GRUNOW-HINDS CO., OF CHICAGO, ILLINOIS, A CORPORATION OF ILLINOIS.

VISOR-COVER STRETCHING AND FRAME-INSERTING MACHINE.

Application filed July 26, 1922. Serial No. 577,781.

*To all whom it may concern:*

Be it known that we, WILLIAM C. GRUNOW and OTTO JOHNSON, citizens of the United States, residing at Chicago and Brookfield, respectively, in the county of Cook and State of Illinois, have invented a certain new and useful Improvement in Visor-Cover Stretching and Frame-Inserting Machines, of which the following is a full, clear, concise, and exact description, reference being had to the accompanying drawings forming a part of this specification.

Our invention relates to visor cover stretching and frame inserting machines which are more particularly adapted for stretching the bag-like visor cover at which time the supporting frame is inserted in the bag and the cover then permitted to contract so as to be held taut by the frame.

In a certain type of visors for automobiles the construction consists of a bag-like cover made of a fabric material with a supporting frame inserted therein, the visor then being adapted to be mounted upon hinges and supported in front of the wind-shield so as to shield the driver against the light or sun's rays.

In assembling the bag and frame of this type of visor great difficulty has heretofore been encountered in inserting the frame in the cover.

A feature of our invention is the provison of a machine for assembling the cover and frame whereby the production has been greatly increased with the same amount of labor, or in other words, the cost of assembling has been greatly reduced.

Another feature is the method of assembling whereby the visor cover is stretched before the frame is inserted and then the frame forcibly inserted into the stretched cover and the assembled parts together pushed off the stretching machine.

For a better understanding of our invention reference is to be had to the accompanying drawings in which Fig. 1 is a plan view of our improved machine;

Fig. 1ª is a section along the line 1ª—1ª of Fig. 1, showing the construction of the stretching arms;

Fig. 2 is a plan view of a bag-like visor cover adapted to be stretched by the machine;

Fig. 2ª shows a sectional view of one end of the visor cover showing how the seam is turned up inside;

Fig. 3 shows the frame for insertion in the visor cover;

Fig. 4 shows the machine with the visor cover thereon and the frame in the cover, both of which are being forced off the machine;

Fig. 5 is a longitudinal sectional view along line 5—5 of Fig. 1;

Fig. 6 is a cross sectional view along the line 6—6 of Fig. 4, and

Fig. 7 is a cross sectional view along the line 7—7 of Fig. 5.

Referring now more in detail to our invention, the preferred form of machine employed includes a base A having relatively movable cover holding and stretching arms, of which arm B is fixedly secured to the base A and arm C adjustably mounted thereon. The holding portions of these arms are of a U-shaped construction as shown in the cross section Figure 1ª so that the visor cover D may be slipped over the arms and the frame E then pushed through the arms into the cover and the cover and frame simultaneously forced off.

Before pushing the frame into the cover the cover is stretched and to this end the movable arm C is adjusted by a crank operated screw 10 which is rotatably supported by a bracket 11 fastened to the frame A as shown in Fig. 5. The screw may be rotated in any desired way, preferably by the hand crank 12. The arm C is an extension of the block portion 13 which is slidably held in the way blocks 14—15. Pusher members are also provided for forcing the frame into the bag or cover and both said elements then off of the stretching arms, and to this end I preferably provide manually lever operated devices each comprising a fixed bracket 16, a hand lever 17 and push rod 18. These push devices are so constructed that a leverage is secured on the push rods thereby making it easier for the operator to force the assembled parts off the machine as this is preferably done while the cover is under the stretching strain. It will be apparent, however, that the stretching strain may be relieved during this operation, if desired.

The machine is preferably employed in the assembling of visor covers, as shown in Fig. 2, made up of a fabric material such as fabrikoid, water-proof top material having the grain running the long way of the cover. These covers are made up of top and bottom sections sewed together with the outsides facing and then turned so that the seam is on the inside as shown in Fig. 2ª. This leaves the cover with one open side so that the metal supporting frame E may be inserted in the bag after which it is stretched transversely and sewed along the dotted line 19 shown in Fig. 2 and which stretching and sewing may be done on a machine as shown in patent for Visor cover stretching and sewing machine, No. 1,501,710, dated July 15, 1924.

Operation.

Now as to the operation, the arms B and C are adjusted into their closed relationship as shown in Fig. 1 so that the visor cover in its normal or contracted condition may be slipped over the arms with the inner seam turned in one direction, preferably over the top of the arms.

These arms, it will be noted, are formed of thin upper and lower plates 20—21, the center slot or opening 22 extending all the way through as indicated by the dotted line 23. The outer or cover supporting edges of the arms are rounded so as to fit the cover and are preferably closed at 24 so as to permit a more ready insertion of the frame and removal of the assembled parts.

The cover having been placed over the arms B—C, handle 12 is rotated to move the arms apart thereby stretching the cover D sufficiently to permit the insertion of the frame E, this stretching position being indicated by the dotted lines at the right of the arm C and cover D in Figs. 1 and 2. The pusher rods 18 are now turned sufficiently to one side to permit insertion of the frame E through the slots in the arms B—C. The frame is pushed in by hand so that it is well inside the arms B—C, after which the pusher levers 17 are moved until the push rods 18 engage the near edge or side of the frame E. The operator now grasps the handles of the levers 17 pulling them toward each other, continuing this movement as indicated in Fig. 4, thereby pushing the frame fully into the cover D and then off of the arms B—C.

By our improved method of assembling the parts we are enabled not only to relieve the operator of the hard labor heretofore necessary, but also reduce the time necessary, thus considerably increasing the production per person. Also, and which is of considerable importance, we are enabled to secure a much tighter cover in that it is normally of a length less than the length of the frame; and by the forcible stretching of the same to permit insertion of the frame, it contracts after the stretching strain has been relieved so that it is very taut, as compared with the method heretofore in use.

What we claim as new and desire to secure by United States Letters Patent is:

1. In a visor cover stretching and frame inserting machine, a pair of arms for insertion in a bag-like visor cover constructed to engage the inside of the cover substantially throughout the length of the sides to be engaged, and means for forcibly separating the arms after the cover is applied to stretch the cover and hold it thus for insertion of a frame.

2. In a visor cover stretching and frame inserting machine, a pair of arms for insertion in a bag-like visor cover constructed to engage the inside of the cover substantially throughout the length of the sides to be engaged, means for forcibly separating the arms after the cover is applied to stretch the cover and hold it thus for insertion of a frame, and mechanical means for pushing the frame into the cover while held in its stretched condition.

3. In a visor cover stretching and frame inserting machine, a pair of arms for insertion in a bag-like visor cover constructed to engage the inside of the cover substantially throughout the length of the sides to be engaged, means for forcibly separating the arms after the cover is applied to stretch the cover and hold it thus for insertion of a frame, and mechanical means for pushing the frame into the cover while held in its stretched condition, the latter means arranged to thereafter push the cover and frame clear of said arms.

4. In a visor cover stretching and frame inserting machine, a pair of arms for insertion in a bag-like visor cover constructed to engage the inside of the cover substantially throughout the length of the sides to be engaged, means for forcibly separating the arms after the cover is applied to stretch the cover and hold it thus for insertion of a frame, and mechanical means for pushing the frame into the cover while held in its stretched condition, the latter means arranged to thereafter push the cover and frame clear of said arms while the cover is under holding strain of the arms.

5. In a visor cover stretching and frame inserting machine, a pair of arms for insertion in a bag-like visor cover constructed to engage the inside of the cover substantially throughout the length of the sides to be engaged, means for forcibly separating the arms after the cover is applied to stretch the cover and hold it thus for insertion of a frame, and means whereby the frame may be pushed into the cover while held in its stretched condition.

6. In a visor cover stretching and frame inserting machine, a pair of arms for insertion in a bag-like visor cover constructed to engage the inside of the cover substantially throughout the length of the sides to be engaged, means for forcibly separating the arms after the cover is applied to stretch the cover and hold it thus for insertion of a frame, and means whereby the frame may be pushed into the cover while held in its stretched condition and thereafter the cover with the frame in it removed from the arms.

7. The method of assembling bag-like visor covers and frames which consists of engaging the cover inside on opposite ends and stretching the cover beyond its normal length, and then inserting a frame into the cover while stretched.

8. The method of assembling bag-like visor covers and frames which consists of engaging the cover inside on opposite ends and stretching the cover beyond its normal length, and then inserting a frame into the cover while stretched, then relieving the cover so as to permit it to contract taut upon the frame.

9. The method of assembling bag-like visor covers and frames which consists of engaging the cover inside on opposite ends and stretching the cover beyond its normal length, then inserting a frame into the cover while stretched, then relieving the cover so as to permit it to contract taut upon the frame, and then securing the cover along the frame while under a subsequent stretching strain.

10. The method of assembling elongated flat bag-like visor covers and frames which consists of engaging the cover inside on opposite ends and stretching the cover one way beyond its normal size, then inserting a frame through the mouth of the cover into the cover while stretched, and then stretching the cover the other way and securing it along the frame while so stretched.

11. The method of constructing visors which consists of providing a bag-like visor cover, a frame for insertion in the cover but of greater length than the normal inner length of the cover, engaging the cover inside on opposite ends and forcibly stretching the cover and holding it thus, inserting the frame while the cover is stretched, and then relieving the stretching force so as to permit the cover to set taut on the frame.

In witness whereof, we hereunto subscribe our names this 23 day of May A. D., 1922.

WILLIAM C. GRUNOW.
OTTO JOHNSON.